Patented Mar. 24, 1953

2,632,748

UNITED STATES PATENT OFFICE 2,632,748

MIXTURES COMPRISING ACRYLONITRILE POLYMERS AND RESINOUS POLYAMINES CONTAINING AMIDE GROUPS

John R. Caldwell, Kingsport, Tenn., assignor to Eastman Kodak Company, Rochester, N. Y., a corporation of New Jersey No Drawing. Application April 18, 1951, Serial No. 221,719

16 Claims. (Cl. 260—30.4)

This invention relates to composite, resinous compositions comprising a mixture of acrylonitrile polymers and resinous polyamines containing amide groups.

Acrylonitrile has previously been used in the preparation of various polymers which are characterized by relatively poor solubilities in many of the common volatile organic solvents, especially polymers having high percentages of acrylonitrile. Such prior art polymers have been further characterized by poor affinity for dyes such as acid wool, direct cotton, insoluble vat and cellulose acetate type dyes, it being well-known that fibers spun from polyacrylonitrile can be passed through such dye baths without material amounts of the dyes being taken up by the fiber.

Numerous attempts have been made to overcome this lack of dyeing deficiency. For example, acrylonitrile has been copolymerized with certain other unsaturated compounds whose polymers are known to have good affinity for various dyes. While this procedure does give polymeric products having improved dyeability, a serious drawback arises in certain instances in that the fibers produced show a materially lower softening point, thus limiting their practical uses. Another procedure employed for the purpose of increasing the dye affinity of polyacrylonitrile has been to mix the polyacrylonitrile, before spinning, with other film-forming materials which are known to be readily dyeable. However, it has been well established that acrylonitrile polymers are incompatible with most other polymeric materials. Out of many hundreds of polymers, resins, cellulose derivatives, etc. that have been tested, only a relatively small number of them have been found compatible. For example, it can be demonstrated that mixtures of polyacrylonitrile with polyvinyl acetate, when dissolved in N,N-dimethyl formamide in proportions varying from 15 to 50 percent by weight of polyvinyl acetate to from 85 to 50 percent by weight of polyacrylonitrile, form grainy dopes which separate on standing into two liquid layers, and that fibers formed from such mixtures show segmentation into their individual components along their horizontal axes. Mixtures of acrylonitrile with certain polyamides such as nylon have been suggested broadly by the prior art, but little is known concerning either the compatibility of specific polyamides with acrylonitrile polymers or the physical and dyeing properties of such compositions. None of the prior art polyamides employed with acrylonitrile polymers contain free amino groups.

I have now found that difficultly-soluble acrylonitrile polymers which contain at least 70 percent by weight of acrylonitrile units can advantageously be mixed in critical proportions with certain resinous polyamines containing amide groups, such resinous polyamines being characterized by being either soluble in water or having high absorption capacity for water and yet being soluble in liquids which are also solvents for acrylonitrile polymers such as dimethyl formamide, dimethyl acetamide, gamma-butyrolactone, ethylene carbonate, ethylene cyanohydrin, etc., to give stable homogeneous solutions and compositions. The fibers produced from such compositions show not only good tensile strength and elongation, but also show excellent dyeability by common types of acid wool dyes applied by standard methods. The new fibers also show improved affinity for cellulose acetate type dyes.

It is, accordingly, an object of my invention to provide composite, resinous compositions comprising acrylonitrile polymer and a condensation polyamine containing amide groups. Another object is to provide methods for preparing these compositions. A further object is to provide homogeneous solutions of these composite, resinous compositions, and fibers prepared therefrom. Other objects will become apparent from a consideration of the following description and examples.

In accordance with my invention, I prepare the composite, resinous compositions of the invention by dissolving from 70 to 90 parts by weight of acrylonitrile polymer and 30 to 10 parts by weight of the desired resinous polyamine containing amide groups, but preferably from 80 to 86 parts by weight of acrylonitrile polymer and from 20 to 14 parts by weight of the said polyamine, in one or more of the mentioned common volatile organic solvents. The solutions thus obtained are clear and homogeneous and do not separate into two layers on standing or during spinning operations. Fibers can be spun from such solutions (dopes) by either the wet or dry spinning methods. The concentration of the polymers in the solvent can vary widely from very low to very high concentrations, but for efficient operations the concentration is advantageously from 5 to 25 percent, but preferably about 10 percent total weight of polymers. The dopes are stable over the usual temperature range of operations for spinning.

The resinous polyamines containing amide groups employed in the practice of my invention are prepared by heating a polyethylene polyamine such as diethylene triamine or triethylene tetramine with a dibasic acid or alkyl esters thereof which are represented by the following general formula:

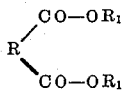

wherein R represents a divalent alkylene group containing from 2 to 8 carbon atoms and $R_1$ represents an atom of hydrogen or an alkyl group containing from 1 to 18 carbon atoms (e. g. succinic acid, glutaric acid, $a,a$-dimethyl glutaric acid, pimelic acid, suberic acid, azelaic acid, sebacic acid or their alkyl esters, etc.) and isolating the product thus formed. Preferably the esters of the mentioned dibasic acids are employed. The reaction is advantageously carried out at a temperature of from 150° to 240° C. and preferably from 180° to 200° C. When esters of the dibasic acids are employed, a reaction temperature of from 130° to 170° C. and preferably from 150° to 160° C. is used. The reaction time is from 4 to 10 hours. No catalyst is necessary, but zinc chloride or toluene sulfonic acid promote the reaction. Advantageously an inert atmosphere, for example nitrogen atmosphere, is maintained during the heating process in order to minimize color formation. One mol of dibasic acid or ester is used per mol of the polyethylene polyamine. The exact structures of the resinous polyamines produced as above are not exactly known but experimental evidence indicates that only the terminal —$NH_2$ groups are converted to amide groups, while the —NH— groups in the linear chain do not enter into the reaction. The resinous polyamines derived are believed to consist of the following recurring structural unit:

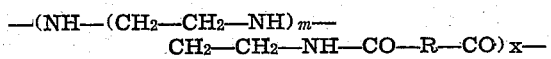

wherein $m$ is 1 or 2, X represents a whole number greater than 10, and R has the previously defined meaning. Thus each unit contains 2 amide groups and 1 free (basic) amino group. The strong affinity shown by my new composite, resinous compositions for acid wool dyes and their great tendency to absorb water can be attributed to the presence of these groups in combination.

The resinous polyamines produced as described in the preceding are tough, waxy solids or hard, brittle glasses, depending upon the particular combination of amine and acid used. Their solubility in water also depends upon the nature of the amine and acid employed. For example, diethylene triamine and adipic acid give a polymer that is soluble in water, whereas diethylene triamine and sebacic acid give a polymer that is insoluble in water but soluble in dilute acid solutions. All of the resinous polyamines employed in the invention are readily soluble in the solvents commonly used in dissolving acrylonitrile polymers.

The acrylonitrile polymers used in the invention can be 100 percent polyacrylonitrile or they can be copolymers containing 70 percent or more by weight of acrylonitrile. Suitable copolymers include any of the vinyl or other unsaturated monomers containing a single ethylenic unsaturation which are known to be copolymerizable with acrylonitrile such as, for example, acrylonitrile-vinyl acetate, acrylonitrile-vinyl chloride, acrylonitrile-methallyl alcohol, and the like. An especially valuable polymer is one containing from 80 to 95 percent by weight of acrylonitrile and from 20 to 5 percent by weight of isopropenyl acetate.

The following examples will serve to illustrate more fully the manner whereby I practice my invention.

Example 1.—10.3 g. (0.1 mol) of diethylene triamine and 25.8 g. (0.1 mol) of diethyl sebacate were heated at 150°–160° C. for from 6–7 hours. A stream of nitrogen was bubbled through the melt for agitation and to maintain an inert atmosphere. After cooling, the product was a hard, tough, pale yellow wax that softened at 80°–90° C. It was soluble in alcohol and dilute aqueous solutions of acids. It was insoluble in water.

A spinning dope was prepared by dissolving 1.0 g. of the above prepared diethylene triamine sebacamide polymer and 6.0 g. of polyacrylonitrile in 40 cc. of dimethyl acetamide. A clear, smooth dope was obtained. The dope was extruded through a multi-hole spinnerette into a spinning bath composed of 35% dimethyl acetamide-65 percent water. The filaments obtained were washed with water and dried at 110°–120° C. The yarn was passed through a steam chamber at 170°–180° C. where it was drafted 600 percent. The yarn obtained had a tensile strength of 4.0 grams per denier and gave an elongation of 22 percent. It dyed well with all types of acid wool dyes. Good dyeing results were also obtained with cellulose acetate dyes.

Example 2.—A spinning dope was prepared by dissolving 1.0 g. of the diethylene triamine sebacamide, prepared as described in Example 1, and 5.0 g. of 86 percent acrylonitrile-14 percent isopropenyl acetate polymer in 35 cc. of gamma-butyrolactone. The dope was extruded through a multi-hole spinnerette into a bath consisting of 70 percent water and 30 percent gamma-butyrolactone. The filaments obtained were washed with water and dried at 110°–120° C., and drafted in the usual manner. The yarn dyed to dark shades with acid wool dyes.

Example 3.—14.6 g. (0.1 mol) of triethylene tetramine and 20.2 g. (0.1 mol) of diethyl adipate were heated at 160° C. for 7 hours in a stream of nitrogen. After cooling, the product was a hard, brittle glass. It was soluble in water, in alcohol and in dimethyl formamide.

A spinning dope was prepared by dissolving 1.0 g. of the above prepared triethylene tetramine adipamide polymer and 6.0 g. of polyacrylonitrile in 40 cc. of dimethyl formamide. The dope was extruded through a multi-hole spinnerette into a heated atmosphere. The filaments obtained were drafted 400–500 percent in a steam chamber. The yarn obtained dyed well with acid wool dyes.

The spinning of fibers from the solutions or dopes of the invention can be carried out by the usual wet spinning methods employing aqueous spinning baths or baths of organic liquids such as the lower alcohols (methanol, ethanol, etc.). Preferably the resinous polyamines that are insoluble in water are used in admixture with acrylonitrile polymers, when wet spinning methods are used, in order to minimize leaching of the polyamine component from the fiber during the precipitating and washing steps. Dry spinning or evaporative methods can also be employed, wherein the dope is extruded into a heated atmosphere of air, steam, or other inert gas. For dry spinning, either the water-soluble or the water-insoluble resinous polyamines can be employed as components in the spinning dopes. After the fibers have been dried and drafted, the polyamine components show little or no tendency to leach out during laundering and dyeing operations. Fibers prepared according to the invention can be dyed to dark shades with the common types of acid wool dyes using standard methods. The dyed fibers show good fastness to light and laundering.

Solutions or dopes of the composite, resinous compositions of the invention, with or without fillers, pigments, dyes, plasticizers, etc., can also be coated on smooth surfaces to give flexible and tough films and sheet materials.

What I claim is:

1. A resinous composition consisting of a mixture of from 70 to 90 parts by weight of a polymer containing at least 70 percent by weight of acrylonitrile units, and from 30 to 10 parts by weight of a resinous, linear polymer obtained by condensing at from 130° to 240° C. equimolar proportions of (1) a compound having the general formula:

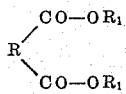

wherein R represents an alkylene group containing from 2 to 8 carbon atoms and $R_1$ represents a member selected from the group consisting of an atom of hydrogen and an alkyl group, and (2) a polyamine compound selected from the group consisting of diethylene triamine and triethylene tetramine.

2. A resinous composition consisting of a mixture of from 70 to 90 parts by weight of polyacrylonitrile and from 30 to 10 parts by weight of a resinous, linear polymer obtained by condensing at from 130° to 170° C. equimolar proportions of diethylene triamine and a dialkyl ester of a saturated aliphatic dibasic acid containing from 4 to 10 carbon atoms.

3. A resinous composition consisting of a mixture of from 70 to 90 parts by weight of polyacrylonitrile and from 30 to 10 parts by weight of a resinous, linear polymer obtained by condensing at from 130° to 170° C. equimolar proportions of triethylene tetramine and a dialkyl ester of a saturated aliphatic dibasic acid containing from 4 to 10 carbon atoms.

4. A resinous composition consisting of a mixture of from 80 to 86 parts by weight of polyacrylonitrile and from 20 to 14 parts by weight of a resinous, linear polymer obtained by condensing at from 130° to 170° C. equimolar proportions of diethylene triamine and a dialkyl ester of a saturated aliphatic dibasic acid containing from 4 to 10 carbon atoms.

5. A resinous composition consisting of a mixture of from 80 to 86 parts by weight of polyacrylonitrile and from 20 to 14 parts by weight of a resinous, linear polymer obtained by condensing at from 130° to 170° C. equimolar proportions of triethylene tetramine and a dialkyl ester of a saturated aliphatic dibasic acid containing from 4 to 10 carbon atoms.

6. A resinous composition consisting of a mixture of from 80 to 86 parts by weight of polyacrylonitrile and from 20 to 14 parts by weight of a resinous, linear polymer obtained by condensing at from 130° to 170° C. equimolar proportions of diethylene triamine and diethyl sebacate.

7. A resinous composition consisting of a mixture of from 80 to 86 parts by weight of polyacrylonitrile and from 20 to 14 parts by weight of a resinous, linear polymer obtained by condensing at from 130° to 170° C. equimolar proportions of triethylene tetramine and diethyl adipate.

8. A resinous composition consisting of a mixture of from 80 to 86 parts by weight of a copolymer consisting of from 80 to 95 percent by weight of acrylonitrile and the remainder of the copolymer of isopropenyl acetate, and from 20 to 14 parts by weight of a resinous, linear polymer obtained by condensing at from 130° to 170° C. equimolar proportions of diethylene triamine and diethyl sebacate.

9. A solution of a resinous composition consisting of a mixture of from 70 to 90 parts by weight of a polymer containing at least 70 percent by weight of acrylonitrile units, and from 30 to 10 parts by weight of a resinous, linear polymer obtained by condensing at from 130° to 240° C. equimolar proportions of (1) a compound having the general formula:

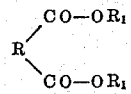

wherein R represents an alkylene group containing from 2 to 8 carbon atoms and $R_1$ represents a member selected from the group consisting of an atom of hydrogen and an alkyl group, and (2) a polyamine compound selected from the group consisting of diethylene triamine and triethylene tetramine, in a solvent selected from the group consisting of dimethyl formamide, dimethyl acetamide, gamma - butyrolactone, ethylene cabonate and ethylene cyanohydrin.

10. A solution of a resinous composition consisting of a mixture of from 70 to 90 parts by weight of polyacrylonitrile and from 30 to 10 parts by weight of a resinous, linear polymer obtained by condensing at from 130° to 170° C. equimolar proportions of diethylene triamine and a dialkyl ester of a saturated aliphatic dibasic acid containing from 4 to 10 carbon atoms, in dimethyl acetamide.

11. A solution of a resinous composition consisting of a mixture of from 70 to 90 parts by weight of polyacrylonitrile and from 30 to 10 parts by weight of a resinous, linear polymer obtained by condensing at from 130° to 170° C. equimolar proportions of triethylene tetramine and a dialkyl ester of a saturated aliphatic dibasic acid containing from 4 to 10 carbon atoms, in dimethyl formamide.

12. A solution of a resinous composition consisting of a mixture of from 80 to 86 parts by weight of polyacrylonitrile and from 20 to 14 parts by weight of a resinous, linear polymer obtained by condensing at from 130° to 170° C. equimolar proportions of diethylene triamine and a dialkyl ester of a saturated aliphatic dibasic acid containing from 4 to 10 carbon atoms, in gamma-butyrolactone.

13. A solution of a resinous composition consisting of a mixture of from 80 to 86 parts by weight of polyacrylonitrile and from 20 to 14 parts by weight of a resinous, linear polymer obtained by condensing at from 130° to 170° C. equimolar proportions of triethylene tetramine and a dialkyl ester of a saturated aliphatic dibasic acid containing from 4 to 10 carbon atoms, in ethylene carbonate.

14. A solution of a resinous composition consisting of a mixture of from 80 to 86 parts by weight of polyacryonitrile and from 20 to 14 parts by weight of a resinous, linear polymer obtained by condensing at from 130° to 170° C. equimolar proportions of diethylene triamine and diethyl sebacate, in dimethyl acetamide.

15. A solution of a resinous composition consisting of a mixture of from 80 to 86 parts by weight of polyacrylonitrile and from 20 to 14 parts by weight of a resinous, linear polymer obtained by condensing at from 130° to 170° C. equimolar proportions of triethylene tetramine and diethyl adipate, in dimethyl formamide.

16. A solution of a resinous composition consisting of a mixture of from 80 to 86 part by weight of a copolymer consisting of from 80 to 95 percent by weight of acrylonitrile and the remainder of the copolymer of isopropenyl acetate, and from 20 to 14 parts by weight of a resinous, linear polymer obtained by condensing at from 130° to 170° C. equimolar proportions of diethylene triamine and diethyl sebacate, in gamma-butyrolactone.

JOHN R. CALDWELL.

REFERENCES CITED

The following references are of record in the file of this patent:

UNITED STATES PATENTS

| Number | Name | Date |
| --- | --- | --- |
| 2,374,354 | Kaplan | Apr. 24, 1945 |
| 2,404,714 | Latham | July 23, 1946 |